May 17, 1966  R. H. LEBOW  3,251,379
HYDRANT COUPLER
Filed Jan. 16, 1963
FIG. 1
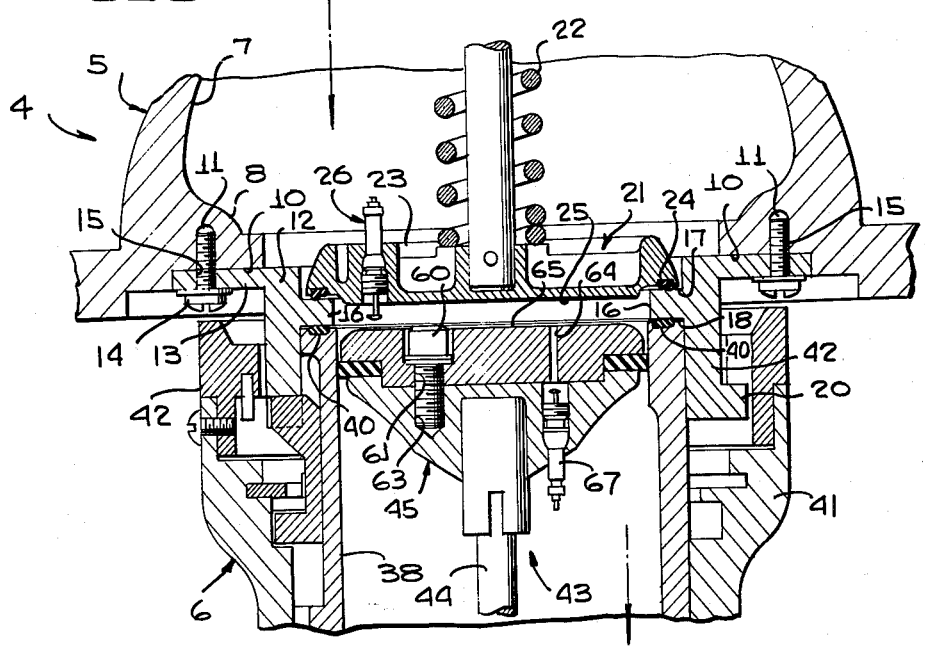
FIG. 2
FIG. 3
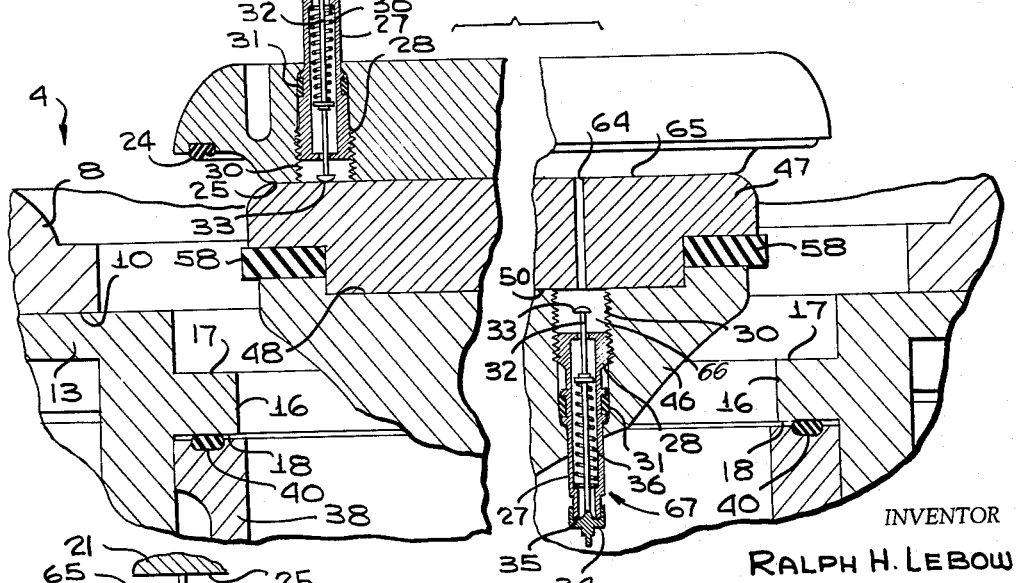
INVENTOR
RALPH H. LEBOW
BY
ATTORNEYS

United States Patent Office 3,251,379
Patented May 17, 1966

3,251,379
HYDRANT COUPLER
Ralph H. Lebow, 17908 Vicino Way, Pacific Palisades, Calif.; Marcia W. Lebow, executrix of said Ralph H. Lebow, deceased
Filed Jan. 16, 1963, Ser. No. 251,839
11 Claims. (Cl. 137—629)

This invention relates to valved couplings, and in particular, to a connection between a hydrant coupler and a hydrant adapter wherein the hydrant coupler alone, or the hydrant adapter alone, or both the hydrant coupler and the hydrant adapter are provided with a fluid pressure relief mechanism which permits an axially movable valve of the hydrant coupler to efficiently unseat an axially movable valve of the hydrant adapter against fluid pressure trapped in the hydrant adapter caused by either leakage of a pressure control valve upstream of the hydrant adapter, thermal expansion of the fluid in the hydrant adapter or by fluid under pressure remaining the adapter after a previous operation.

In hydrant type fueling systems for refueling aircraft, a filling hose having a hydrant coupler attached thereto is secured to a hydrant adapter of an underground fuel storage installation by bringing the hydrant coupler into cooperative relation with a coupling mechanism of the hydrant adapter and manually turning the hydrant coupler or a part thereof to effect a secure coupling of the coupler to the adapter. The hydrant adapter is installed on the outlet or downstream side of a pressure control valve and the latter is connected to the underground storage tank from which the fuel is then pumped through the pressure control valve, the hydrant adapter, the hydrant coupler and the hose to the fuel tanks in the aircraft.

At the end of a fueling operation fuel under pressure is usually trapped in the hydrant adapter between a poppet valve thereof and the pressure control valve. The range of pressure of the fuel so trapped is generally in the range of 60 to 70 p.s.i., this being the approximate pressure in the hydrant adapter during delivery of fuel to the aircraft. The pressure of the entrapped fluid may be further increased either as a result of leakage of fluid through the pressure control valve, which causes the entrapped fluid to rise to a pressure equal to the hydrant pump pressure, or due to thermal expansion of the entrapped fluid. In hydrant couplings heretofore in use it is difficult to open the coupler and adapter valves because they must be opened against the full pressure of the fluid trapped between the adapter and pressure control valve. The adapter valve is opened against this trapped, pressurized fluid by a poppet valve in the hydrant coupler which is moved axially to abut and unseat the adapter valve. The force which must be applied to the coupler valve to unseat the adapter valve must be sufficient to overcome the pressure of the entrapped fluid. Furthermore, as the coupler and adapter valves are being opened, the trapped fluid becomes compressed to further increase the pressure thereof.

The compressing of the entrapped fluid occurs in two stages. The first stage occurs during the initial opening movement of the adapter valve by the coupler valve. This is usually the lesser force tending to compress the entrapped fluid since, as soon as the adapter valve is unseated, the entrapped fluid expands into small spaces between the two valves and momentarily reduces the pressure slightly. However, as the coupler valve continues to move axially, the pressure of the entrapped fluid rises once again because the fluid is now entrapped between the pressure control valve and the coupler valve which is still in sealing engagement in the coupler body. Thus, the coupler valve, in moving toward its open position must either compress the entrapped fluid or displace it back through the pressure control valve into the upstream system against full pump pressure.

An object of this invention is to provide a hydrant coupling of the type above described in which one or a plurality of fluid pressure relief mechanisms are incorporated in either or both coupler and adapter valves for relieving the pressure of fluid trapped between the adapter valve and the pressure control valve so that the coupling valves may be moved with relative ease and a minimum of force to open position.

A further object of this invention is the provision of a hydrant coupling including a hydrant adapter having a first axially movable valve housed therein in opposition to a second axially movable valve in a hydrant coupler, the coupler valve including a relief mechanism for communicating a space between the coupler and adapter valves with the rear side of the coupler valve for relieving the pressure of fluid trapped on the rear sides of the adapter valve.

A further object of this invention is to provide a hydrant coupling of the type described in which there is a bleed valve associated with the adapter valve which is actuated by contact with the coupler valve for bypassing fluid trapped behind the adapter valve to a region between the valves of the coupler and adapter, and there is another bleed valve associated with the coupler valve for bypassing the fluid from between the coupler and adapter valves to a region behind the coupler valve.

Another object of this invention is the provision of a coupling of the type immediately above described, and in addition, to provide the contact actuated bleed valve of the adapter valve with a contact arm projecting beyond the adapter valve into a space between the coupler and adapter valves whereby the bleed valve is actuated by the contact thereof with the coupler valve as the latter is moved axially toward the adapter valve.

With the above and other objects in view that will hereinafter appear, the nature of the invention will be more clearly understood by a reference to the following detailed description, the appended claims and the several views illustrated in the accompanying drawings.

In the drawings:

FIG. 1 is a fragmentary vertical sectional view of a coupling constructed in accordance with this invention, and illustrates a hydrant coupler secured to a hydrant adapter, a poppet valve axially movable in the hydrant adapter and opposed to an axially movable poppet valve in the hydrant coupler, a pressure actuated bleed valve in the coupler valve and a contact actuated bleed valve in the adapter valve.

FIG. 2 is an enlarged fragmentary vertical sectional view of the adapter valve and the coupler valve, and shows the valves in a position after the respective bleed valves thereof have been actuated and the adapter valve has been unseated.

FIG. 3 is an enlarged fragmentary view of a modified form in which the bleed valve in the coupler valve is actuated by contact with the adapter valve.

Referring in detail to the drawing, coupling 4 is shown best in FIG. 1 and includes two valved coupling members, one a hydrant adapter 5 and the other a hydrant coupler 6. These members may be similar to the adapter and nozzle disclosed in Davies Patent 2,519,358 except with additional features herein described.

Hydrant adapter 5 includes a conduit 7 having an inwardly directed peripheral flange 8 which is provided with a peripherally recessed portion 10 and a plurality of circumferentially spaced threaded apertures 11.

A tubular member 12 is secured to the inwardly directed peripheral flange 8 by means of an integral outwardly directed peripheral flange 13 seated in the peripheral recessed portion 10 and secured therein by a plurality of bolts 14 passing through apertures 15 in the outwardly directed peripheral flange 13 and threaded into the threaded apertures 11, an inwardly directed peripheral flange 16 of the tubular member 12 forms an upward facing valve seat 17 and a lower facing abutment shoulder 18. A locking member 20 on the tubular member 12 secures the hydrant adapter 5 to the hydrant coupler 6 in a manner disclosed in the above mentioned patent but which considered unnecessary to further describe herein since the same forms no part of this invention.

A first hydrant adapter poppet valve 21 is supported (by means not shown) in the first conduit 7 of the hydrant adapter 5. Valve 21 is axially movable in the conduit 7 and is normally biased by a compression spring 22 bearing against a valve head 23 of valve 21 into sealing contact with valve seat 17. An annular gasket 24 in a lower face 25 of the valve head 23 is adapted to provide efficient sealing between the adapter valve 21 and the valve seat 17.

As is best illustrated in FIG. 2 of the drawing, a first fluid pressure relief mechanism 26 is partially housed in the valve head 23 of the adapter valve 21. The pressure relief mechanism 26 is a contact actuated bleed valve including a tubular housing 27 having a threaded end portion 28. A partially threaded bore 30 extending upwardly from the valve face 25 cooperates with the threaded end portion 28 of the bleed valve 26 to secure the same in the valve head 23. A valve stem or arm 32 is telescopically slidable in the tubular housing 27 of the bleed valve 26. One end of the valve stem or arm 32 is provided with a contact head 33 while an opposite end of the valve stem 32 is provided with a valve head 34. The valve head 34 of the bleed valve 26 cooperates with a valve seat 35 on the tubular housing 27 when a compression spring 36 in the tubular housing 27 biases the valve stem 32 downwardly beyond the face 25 of the adapter valve 21, as is clearly illustrated in FIG. 1.

The hydrant coupler 6 includes a second conduit or sleeve 38 having a packing 40 in contact with the annular shoulder 18 of the tubular member 12. The sleeve 38 is secured in abutment with the annular shoulder 18 by an outer shell 41 having a locking portion 42 at an upper end thereof cooperative with the flange 20 on the tubular member 12.

A second hydrant coupler poppet valve 43 is supported in the inner sleeve 38 in opposed relationship to the hydrant adapter poppet valve 21. Valve 43 is axially movable in the sleeve 38 of the hydrant coupler 6 by a manually actuated mechanism (not illustrated) coupled to a rod 44 of the coupler valve 43.

Coupler valve 43 includes a two piece valve head 45 secured to an end portion of the actuatable rod 44. The two piece valve head 45 includes a lower valve head section 46 and an upper valve head section 47. A circular recess 48 in the lower valve head section 46 partially receives a depending circular boss 50 of the upper valve head section 47. An annular gasket 58 is positioned between the lower valve head section 46 and the upper valve head section 47 to create a seal between the hydrant coupler poppet valve 45 and the sleeve 38, as is clearly shown in FIG. 1. The lower valve head section 46 and the upper valve head section 47 are secured together by a plurality of bolts 60 (only one being illustrated in FIG. 1) pass through respective openings 61 in the upper valve head section 47 and threaded into a threaded portion 63 in the lower valve head section 46.

An axial port 64 opens upwardly through a face 65 of the upper valve head section 47 and downwardly into a bore 66 in the lower valve head section 46. A second fluid pressure relief mechanism 67, identical to the first fluid pressure relief mechanism 26 in the hydrant adapter poppet valve 21, is located in the bore 66 of the lower valve head section 46. The fluid pressure relief mechanism 67 is a pressure actuated bleed valve comprising a tubular housing 27 having a threaded end portion 28 threadably received in a threaded portion 30 of the bore 66. A gasket 31 creates a seal between the tubular housing 27 and the bore 66. A contact arm or stem 32 is slidably telescoped in the tubular housing 27. The contact arm or stem 32 is axially aligned with the port 64 in the upper valve head section 47 and is provided at an end portion thereof with a head 33. A valve head 34 on the opposite end of the stem 32 is biased by a compression spring 36 keyed to the stem 32 in sealing contact with a valve seat 35 of the housing 27.

When it is desired to fill a tank from a fluid reservoir, the hydrant coupler 6 is secured to the hydrant adapter 5 by rotating the outer shell 41 of the hydrant coupler 6 until the locking portions 20 and 42 cooperate to secure the hydrant coupler 6 to the hydrant adapter 5. When the hydrant coupler 6 has been secured to the hydrant adapter 5, the various components of the hydraulic coupling 4 are in the positions illustrated in FIG. 1. That is, the bleed valves 26 and 67 are closed, the hydrant adapter poppet valve 21 is seated on the valve seat 17 and the hydrant coupler poppet valve 43 is spaced from the face 25 of the hydrant adapter poppet valve 21.

As was previously mentioned, fluid under pressure from a previous operation is trapped in the conduit 7 of the hydrant adapter 5 between the valve head 23 of the hydrant adapter poppet valve 21 and a hydrant pressure control valve (not shown) located upstream of the hydrant adapter poppet valve 21; the direction of fluid flow being indicated by the broken arrows in FIG. 1.

The hydrant adapter poppet valve 21 must be moved upwardly from the position shown in FIG. 1 against the fluid under pressure trapped in the conduit 7 of the hydrant adapter 5 before fluid can flow through the coupling 4 in the direction of the broken arrows.

The hydrant adapter poppet valve 21 is unseated from the valve seat 17 of the tubular member 12 by actuating a mechanism (not shown) coupled to the rod 44. The rod 44 and the hydrant coupler poppet valve 45 move upwardly toward the face 25 of the adapter valve 21 until valve face 65 contacts head 33 of bleed valve 26 in the adapter valve 21. As the coupler valve 43 continues to move upwardly, the contact arm or stem 42 of the bleed valve 26 causes the valve head 34 thereof to progressively unseat. As the valve head 34 of the bleed valve 26 is unseated, the pressurized fluid entrapped in the conduit 7 of the hydrant adapter 5 is bled off through the bleed valve 26 into the area between the valve faces 25 and 65, through the port 64 and the pressure actuated bleed valve 67 to an area behind coupler valve 43. Part of the trapped fluid is thus bled off before the valve faces 25 and 65 contact each other and prior to the unseating of the adapter valve 21 from the valve seat 17. The trapped fluid which remains is under a reduced pressure determined by spring 36 of bleed valve 67. Such reduced pressure may be on the order of 60 p.s.i. This reduced pressure, plus the force of spring 22, remain to be overcome in unseating adapter valve 21.

It should be noted that in the absence of the bleed valves 26 and 67, when the adapter valve 21 has been slightly unseated the coupler valve 43 is still in sealing contact with the sleeve 38. In this position the fluid pressure trapped in the conduit expands slightly into the area between the valve faces 25 and 65 and momentarily reduces the pressure slightly. However, as the coupler valve 43 continues to travel, keeping in mind that it is still sealed to the sleeve 38 by the annular gasket 58, the pressure again rises since the fluid is now trapped between the coupler valve 43 and the hydrant pressure control valve located upstream as previously noted. The pressure in the conduit 7 of the hydrant adapter 5 continues to rise until the annular gasket 58 of the coupler valve 43 moves out of sleeve 38.

The hydrant coupling 4 has been disclosed in a preferred embodiment thereof, however, numerous modifications of the disclosed coupling will occur to those well versed in the art. For example, the bleed valves 26 and 67 may be replaced by ball valves, and either one of the bleed valves 26 and 67 may be eliminated from the hydraulic coupling, although it should be readily apparent that the absence of either of the bleed valves is less desirable than the preferred embodiment in which both of the bleed valves cooperate in the novel manner heretofore described. Also bleed valve 67 can be a contact type like 26 instead of pressure actuated, in which case head 33 is omitted and stem 32 extends through port 64 beyond face 65, as shown in FIG. 3, so as to be contacted by face 25 for opening the bleed valve by moving head 34 from its seat 35.

While a preferred example disclosure of a hydraulic coupling is disclosed herein, it is to be understood that variations in the various structures and arrangements thereof may be made without departing from the spirit and scope of this invention as defined in the appended claims.

I claim:

1. A valved coupling including first and second coupling members secured to each other, a first movable valve in the first member opposed to a second movable valve in the second member, a first relief mechanism in the first valve and a second relief mechanism in the second valve, said first relief mechanism being operative upon the movement of said second movable valve to conduct fluid under pressure from behind the first valve to a region between the valves, said second relief mechanism being operative upon continued movement of said second movable valve to conduct fluid under pressure from the region between the valves to a region behind the second valve said second relief mechanism being operated by contact with the first valve, and the first relief mechanism being operated by contact with the second valve.

2. A coupling including first and second coupling members secured to each other, a first valve for controlling flow of fluid through said first member and a second valve for controlling flow of fluid through said second member, and first and second relief mechanisms carried by said respective first and second valves, and means for moving said valves relative to each other between a first position at which said first relief mechanism is opened by said second valve to conduct fluid under pressure from behind the first valve to a region between the valves while preventing the conduction of fluid from the region between the valves to a region behind the second valve, and a second position to conduct fluid under pressure from the region between the valves to a region behind the second valve.

3. The coupling of claim 2 in which one of the relief mechanisms comprises a fluid pressure operated bleed valve responsive to a predetermined pressure of fluid in said region between said valves.

4. The coupling of claim 2 in which one of the relief mechanisms comprises a bleed valve openable by contact with said first valve.

5. A coupling comprising first and second coupling members, said first member including a housing having an opening therethrough, an inturned flange surrounding the opening and providing first and second valve seats on opposite sides thereof, a first valve engageable with said first seat for controlling flow of fluid through said housing, said second coupling member including a sleeve having a flow passage therethrough, one end of said sleeve being sealingly engageable with said second seat, a second valve within said sleeve and movable out of the same into contact with said first valve for moving the latter off its seat, said second valve having sealing engagement with the wall of said flow passage for closing the same while said second valve is within said sleeve, an initial space between said first and second valves when the latter are closed, a bleed passage through said first valve connecting said space with the rear of said first valve, a bleed valve for controlling flow of fluid through said bleed passage, a stem for opening said bleed valve projecting into said space, said second valve being engageable with said stem for opening said bleed valve when the second valve is moved toward the first valve and prior to movement of said second valve out of sealing engagement with said flow passage whereby fluid on the rear side of said first valve may enter said space prior to unseating of the first valve by the second valve.

6. The coupling of claim 5 in which there is a second bleed passage through the second valve and there is a second bleed valve for controlling flow of fluid through said second bleed passage, said second bleed valve being responsive to a predetermined pressure of fluid within said space for opening said second bleed passage.

7. The coupling of claim 5 in which there is a second bleed passage through the second valve and there is a second bleed valve for controlling flow of fluid through said second bleed passage, said second bleed valve being openable by contact with said first valve upon predetermined movement of said second valve toward said first valve.

8. A valve coupling including first and second coupling members secured to each other, a first movable valve in the first member opposed to a second movable valve in the second memrber, a first relief mechanism in the first valve and a second relief mechanism in the second valve, said first and second valves being normally positioned in spaced relationship, means for moving one of said valves more closely adjacent another of said valves in a first position whereby one of said relief mechanisms is operated to conduct fluid under pressure only from behind the first valve to a region between the valves, and a second position at which the other of the relief mechanisms is operative to conduct fluid under pressure from the region between the valves to a region behind the second valve.

9. A valve coupling including first and second coupling members secured to each other, a first movable valve in the first member in axially opposed relationship to a second movable valve in the second member, a first relief mechanism in the first valve and a second relief mechanism in the second valve, said first and second relief mechanisms being in axially offset relationship, said first and second valves being normally positioned in spaced relationship, means for moving one of said valves more closely adjacent another of said valves in a first position whereby only one of said relief mechanisms is operated to conduct fluid under pressure only from behind the first valve to a region between the valves, and a second position at which the other of the relief mechanisms is operated to conduct fluid under pressure from the region between the valves to a region behind the second valve.

10. The valve coupling as defined in claim 9 wherein one of said relief mechanisms is a pressure actuated bleed valve.

11. The valve coupling as defined in claim 9 wherein one of said relief mechanisms is a bleed valve actuated by contact with one of said first and second valves.

References Cited by the Examiner
UNITED STATES PATENTS

| 2,401,674 | 6/1946 | Vizay | 141—294 |
| 2,543,590 | 2/1951 | Swank | 137—614.06 |
| 2,729,471 | 1/1956 | Fraser | 137—630.14 X |
| 3,035,595 | 5/1962 | Beason | 137—629 X |
| 3,125,135 | 3/1964 | Boyer | 141—293 X |
| 3,155,370 | 11/1964 | Drumm et al. | 137—614.06 X |

MARTIN P. SCHWADRON, *Primary Examiner.*

WILLIAM F. O'DEA, ISADOR WEIL, *Examiners.*

J. O'NEILL, *Assistant Examiner.*